United States Patent [19]
Morey et al.

[11] Patent Number: 5,442,511
[45] Date of Patent: Aug. 15, 1995

[54] GENERIC SOLENOID DRIVER CIRCUIT BOARD, CIRCUIT AND METHOD OF MAKING SAME

[75] Inventors: Stephen J. Morey; Joseph G. Kozlevcar, both of Peoria, Ill.

[73] Assignee: Caterpillar Inc., Peoria, Ill.

[21] Appl. No.: 40,221

[22] Filed: Mar. 30, 1993

[51] Int. Cl.⁶ .................... H01H 47/02; H01H 47/04
[52] U.S. Cl. .................... 361/154; 361/191; 361/776; 307/40; 174/254
[58] Field of Search ............... 361/633, 776, 139, 152, 361/154, 160, 191; 174/254; 307/38, 40, 42

[56] References Cited

U.S. PATENT DOCUMENTS

| | | | |
|---|---|---|---|
| 3,621,116 | 11/1971 | Adams | 174/68.5 |
| 3,845,362 | 10/1974 | Roe | 361/172 |
| 3,880,610 | 4/1975 | Long | 29/846 |
| 4,173,031 | 10/1979 | Leichle | 361/191 |
| 4,222,088 | 9/1980 | Burton | 361/172 |
| 4,238,813 | 12/1980 | Carp et al. | 361/154 |
| 4,481,554 | 11/1984 | Henricks et al. | 361/152 |
| 4,674,007 | 6/1987 | Tragen | 361/772 |
| 4,742,327 | 5/1988 | Burgess et al. | 361/172 |
| 4,848,943 | 7/1989 | Sutcliffe | 361/152 |
| 4,897,759 | 1/1990 | Becker | 361/151 |

*Primary Examiner*—A. D. Pellinen
*Assistant Examiner*—Fritz M. Fleming
*Attorney, Agent, or Firm*—R. Carl Wilbur

[57] ABSTRACT

A generic solenoid driver circuit and circuit board may be used in a plurality of application specific driver circuits. The circuit board includes a plurality of binary driver circuit locations, proportional circuit locations, and jumper locations. Electrical components are inserted at those locations needed for the circuit to perform the functions of the specific application. Microprocessor controlled switches may be substituted for the jumper locations so that the solenoid driver circuit configuration may be software controlled.

3 Claims, 2 Drawing Sheets

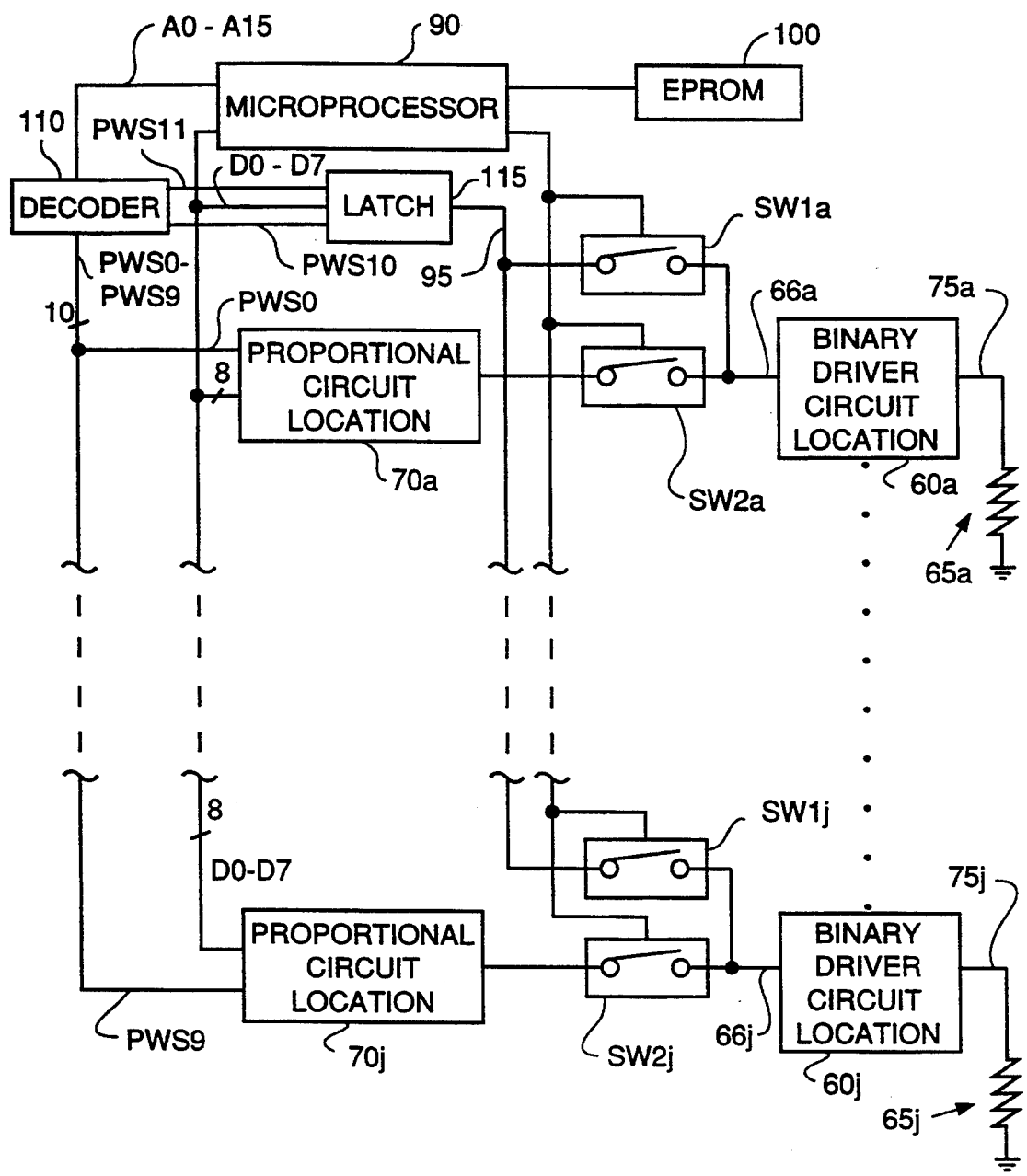

GENERIC SOLENOID DRIVER CIRCUIT BOARD, CIRCUIT AND METHOD OF MAKING SAME

TECHNICAL FIELD

The present invention relates generally to electrical circuits and, more specifically, to a generic solenoid driver circuit and circuit board.

BACKGROUND OF THE INVENTION

Typically, manufacturers of application specific circuits will design a distinct PC board for each circuit. The number of that specific PC board manufactured is then determined by the number required for that specific application. The manufacturing cost of a printed circuit board (PC board) is directly related to its volume of manufacture. When the specific application requires a small number of PC boards, the cost of those boards can be quite high.

In the area of automatic transmission or power train controls it is often necessary for a single solenoid driver circuit to control as many as ten or more different solenoids or, depending on the specific transmission control application, as few as one or two solenoids. Moreover, in addition to the different numbers of solenoids that must be controlled in different circuit applications, there are also two principal types of solenoid control: proportional control and binary (on/off) control. In any given transmission control application there can be many different combinations of the number and types of solenoid controls that must be implemented by the solenoid driver circuitry. Generally, each of those specific solenoid driver applications requires a different PC board and its limited application makes each board costly. It would be preferable to find a way to reduce such costs.

The present invention is directed toward overcoming this problem.

SUMMARY OF THE INVENTION

The present invention contemplates a generic circuit board that can perform a range of functions, where the specific functions performed by the circuit board are determined by the components installed on the PC board. Then, because the generic PC board can be used in many different applications simply by changing the components installed on the board, the generic PC board achieves the cost advantages associated with large volume production while still maintaining the individual functionality required for different applications.

The present invention also contemplates a generic solenoid driver circuit that may be reconfigured for use in a plurality of solenoid driver configurations or that may be reconfigured through software control.

In accordance with the present invention there is provided a generic solenoid driver circuit board, for use in a plurality of application specific solenoid driver circuits, comprising a plurality of binary driver circuit locations including electrical runs connecting binary driver circuit component sites; a plurality of proportional circuit locations including electrical runs connecting proportional circuit component sites; and a plurality of jumper locations electrically connected with said binary driver circuit locations and said proportional circuit locations.

In another aspect there is provided a method for making an application specific solenoid driver circuit, comprising the steps of: selecting electrical components; inserting said electrical components in component sites of a binary driver circuit location; and electrically connecting a jumper location associated with the binary driver circuit location in which electrical components have been inserted.

Other features and advantages of the present invention will become apparent from the following detailed description in conjunction with the drawings and appended claims.

BRIEF DESCRIPTION OF THE DRAWINGS

FIG. 2 illustrates, in block diagram form, an embodiment of the present invention including microprocessor controlled switches.

DETAILED DESCRIPTION OF THE INVENTION

Figure 1:
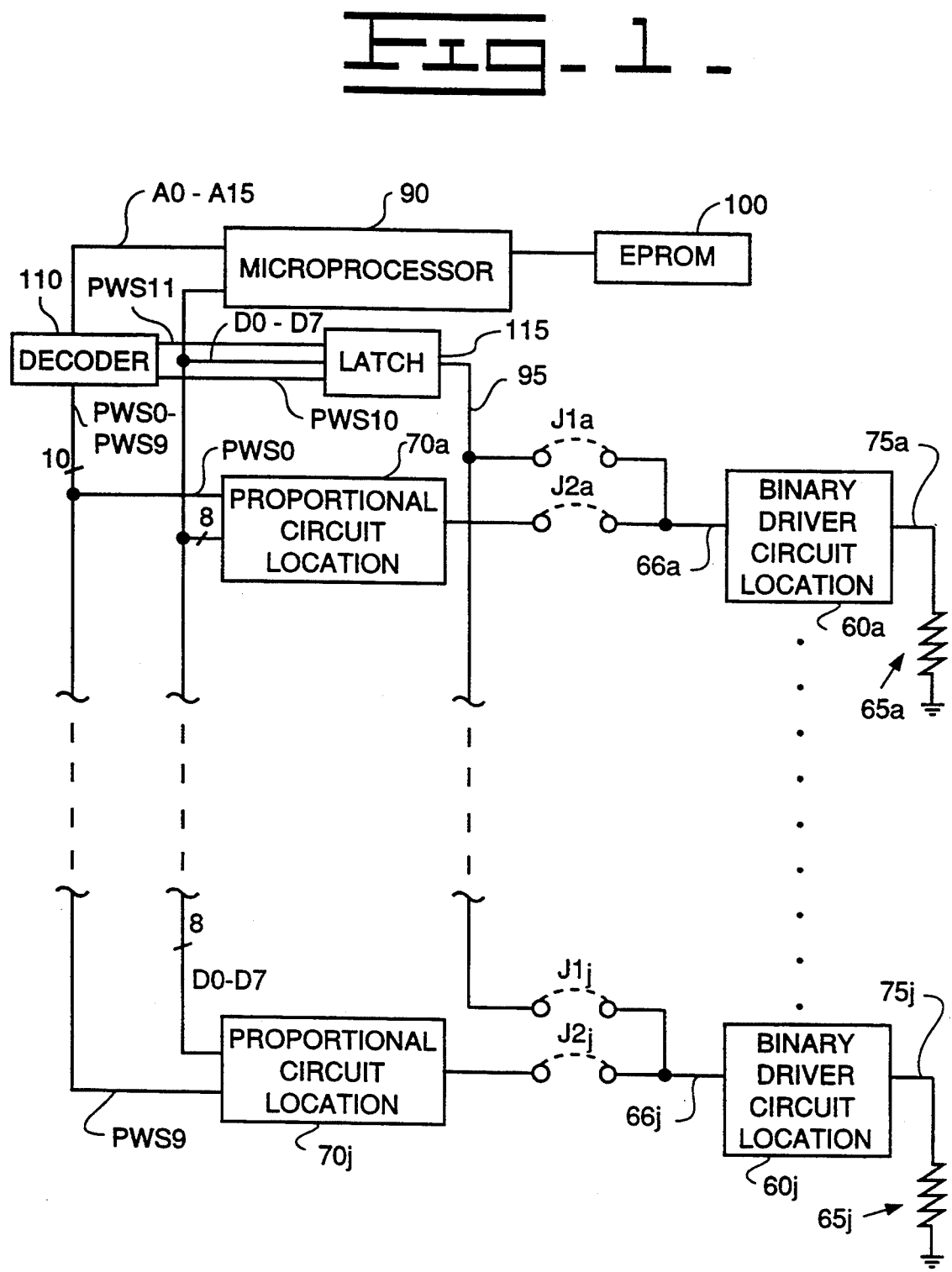
FIG. 1 illustrates, in block diagram form, a generic solenoid driver circuit embodying the present invention.

FIG. 1 is a block diagram in which signal conditioning, filtering and other associated circuitry is not shown. Those features are well known in the art of circuit design and one skilled in the art can readily implement them in connection with the preferred embodiment.

In a preferred embodiment, the circuit board includes runs and electrical connections for ten different binary solenoid driver circuits 60a-60j. FIG. 1 shows the first and tenth of the ten solenoid drivers. The second through ninth are not specifically shown, but are represented by the broken electrical connections and the ellipsis connecting the first and tenth solenoid drivers. The number of solenoid drivers is arbitrary and depends on the maximum number of solenoids that need to be controlled in a specific application. The number of drivers can easily be increased or decreased by one skilled in the art.

The solenoid driver circuitry includes binary (on/off) type driver circuits 60a-60j that drive current through the solenoid coil 65a-65j in response to a command signal 66a-66j. In binary driver circuit 60a, for example, when the command signal 66a is a logic level high (typically five volts) the binary driver circuit 60a drives full current through the solenoid coil 65a thereby activating the solenoid. To create a proportional solenoid driver any command signal 66a-66j of the particular driver may be pulse width modulated. If the command signal 66a is so modulated, it will cause the binary driver circuit 60a to pulse current to the solenoid coil 65a. Thus, each output 75a-75j of each particular binary driver 60a-60j may also be pulse width modulated. Because the bandwidth of the solenoid coils 65a-65j is typically very low, the pulse width modulated output signals 75a-75j will approximate a steady current output that is proportional to the duration of the pulse widths during each duty cycle.

The output of the proportional circuitry 70a-70j is the command input 66a-66j to the respective binary driver 60a-60j. The proportional circuitry 70a-70j each produces a pulse width modulated command signal. The pulse widths are a function of the eight data bits D0-D7 appearing at the inputs to the proportional circuitry 70a-70j. The number of data bits determines the resolution of the proportional driver. Thus, because there are eight data bits D0-D7 that are inputs to the proportional circuitry 70a–70j in the preferred embodiment, there are 256 different pulse width outputs from the proportional circuitry 70, which will produce 256 different currents applied across any one of the solenoid coils 65a–65j.

For example, in this preferred embodiment the underlying frequency of the pulse widths is 120 Hz. If a user wants the solenoid 65a to be fully activated then the command 66a pulse would be 1/120 seconds in duration (i.e. the entire duty cycle). However, if the user desired the current through the solenoid to be half of the maximum current, then the pulse would be on for 1/240 seconds and off for 1/240 seconds. Because the bandwidth of the solenoid coil 65a is very low, the current flowing through the coil 65a is approximately half of full current. In a similar manner, the proportional circuitry 70a can adjust the width of the command pulse to drive other current levels through the solenoid coil 65a.

The user may select whether a particular driver circuit will act as a binary (on/off) driver or a proportional driver by selectively placing a jumper across either J1a–J1j or J2a–J2j. If the user places a jumper across J1a, then that particular driver 60a will act as a binary driver applying either full current to the solenoid coil 65a or no current. If the user instead places a jumper across J2a, then the command input 66a to solenoid driver 60a will be produced by the proportional circuitry 70a.

A microprocessor 90 controls the commands issued to each of the solenoid driver circuits through the data bus D0–D7 and several of the address lines A0–A15. The address lines A0–A15 are input to a decoder 110 which issues clock signals PWS0–PWS9 to the proportional circuitry 70a–70j and clock signals PWS10, PWS11 to a binary command latch 115. The decoder does not require all sixteen address lines A0–A15 that are available on most microprocessors to issue the eleven clock signals PWS0–PWS11. As can be appreciated, some addresses may be reserved to perform other functions or may be used to drive more solenoids if the circuit should contain more than ten drivers. Otherwise, if those additional functions are not necessary, a microprocessor having fewer address lines may be used.

The microprocessor 90 causes a specific address to appear on the address bus A0–A15, which correspond to one of the clock signals PWS0–PWS11. The decoder 110 reads the address bus A0–A15 and causes a specific clock signal PWS0–PWS11 to go high. Depending on the clock signal, one of the proportional circuits 70a–70j or the upper eight bits or lower eight bits of the binary command latch 115 will latch the data appearing on the data bus D0–D7. After latching the necessary data, the binary command latch 115 may issue a command 66a–66j to the appropriate binary driver circuity 60a–60j and/or the proportional circuitry 70a–70j may issue a pulse width modulated command.

The binary latch described herein is a sixteen bit latch. The lower eight bits are latched from the data bus D0–D7 upon receiving clock signal PWS10. The upper eight bits are latched from the data bus D0–D7 upon receiving the clock signal PWS11. It can be appreciated that although the preferred embodiment is described in connection with a sixteen bit latch, other known latches may be substituted. For example, in an embodiment with ten solenoid drivers, it is also possible to use an eight bit latch and a four bit latch. Such combinations are known in the art and are readily and easily substituted for a single sixteen bit latch.

The microprocessor 90 control and addressing is determined by software stored in an EPROM 100 or in another suitable memory device. The present invention is not affected by the particular control scheme implemented in software and thus a particular software control is not described herein.

The circuit board is provided with all the electrical connections or runs necessary to implement all driver circuits. Each functional sub-circuit will have all the necessary runs connecting pre-drilled holes where components may be inserted. Each sub-circuit has a specific location on the board. Thus, in the preferred embodiment, there will be ten binary driver circuit 60a–60j locations and ten proportional circuit 70a–70j locations. The user then needs only to insert the components in the specific sub-circuits necessary to enable the overall solenoid driver circuitry to perform the desired functions. For example, if the user needed a circuit with two binary driver circuits 60 and two proportional drivers then components would be installed in four binary driver circuit 60a–60d locations and in two proportional circuit 70c, 70d locations associated with two of the four binary circuits. A jumper across J1a, J1b creates two binary circuits. A jumper across J2c, J2d on the two remaining circuits creates two proportional driver circuits.

Thus, in this preferred embodiment it can be seen that the same generic circuit board may be used to create a solenoid driver circuit to drive up to ten solenoids, and each solenoid may be controlled either in a binary fashion or proportionally by adding components to the circuit in the binary circuit 60 locations and/or the proportional circuit 70 locations.

In another aspect of the invention, the user may need a single generic solenoid driver circuit that can be adapted for use in many configurations. In that instance, all electrical components may be installed on a particular solenoid driver circuit board. Because the circuit may include components that are infrequently used, the overall circuit may be more expensive than an application specific circuit. However, the circuit is more flexible because it can be used in a wide variety of applications.

Depending on the specific application, the user may place jumpers across J1 or J2, or if no output is desired from a particular solenoid driver then no jumper would be used. Thus, using the above example, if the user needs two proportional solenoid drivers and two binary solenoid drivers, jumpers would be placed across J1a, J1b and across J2c, J2d. Because no jumper would be associated with the remaining solenoids, the remaining solenoid drivers would have no output. In this manner, the generic circuit produces the same desired result as described above. However, it has the additional advantage of being able to be quickly and easily modified to change the driver configuration simply by adding, deleting or moving jumpers.

In still another aspect of the invention, a microprocessor (e.g. 90) controls the configuration of the solenoid driver circuit. Referring now to FIG. 2, microprocessor controlled switches SW1a–SW1j, SW2a–SW2j of the type known in the art are substituted for the jumper connections. Using the above example, if two proportional solenoid drivers and two binary solenoid drivers are needed, the user programs the EPROM 100 so that microprocessor 90 closes the switches SW1a, SW1b, SW2c, SW2d which are substituted for jumpers J1a, J1b and J2c, J2d. Because no output is required from the remaining drivers, the microprocessor need not close any switches SW1e–j, SW2e–j associated with the remaining drivers. In this manner, the generic microprocessor controlled circuit produces the same desired result as described above. However, it has the additional advantage of being able to be easily modified by simply replacing the EPROM 100 or changing a few lines of software included in the EPROM 100.

We claim:

1. A generic solenoid driver circuit board for use with a plurality of solenoid driver circuits, comprising:
   a plurality of binary driver circuit locations, including electrical runs connecting binary driver component sites in a manner that permits selected binary driver electrical components to function as a binary driver circuit when appropriately installed in the binary driver component sites;
   a plurality of proportional driver circuit locations, including electrical runs connecting proportional driver component sites in a manner that permits selected proportional driver electrical components to function as a proportional driver circuit when appropriately installed in the proportional driver component sites;
   a memory device;
   a decoder device, electrically connected to said plurality of proportional driver circuit locations;
   a latch device;
   a plurality of first jumper locations, each of said first jumper locations being electrically connected to one of said plurality of binary driver circuit locations and to one of said plurality of proportional driver circuit locations;
   a plurality of second jumper locations, each of said second jumper locations being electrically connected to said latch and to one of said plurality of binary driver circuit locations;
   a microprocessor electrically connected to said memory device, said decoder, said latch and said plurality of proportional driver circuit locations;
   a jumper, wherein said jumper is installed in at least one of said plurality of first or second jumper locations;
   wherein at least one of said plurality of binary driver circuit locations is electrically connected to a solenoid; and
   wherein electrical components are inserted in at least one of said plurality of binary driver circuity locations.

2. The generic solenoid driver circuit board of claim 1, wherein electrical components are inserted in at least one of said plurality of proportional driver circuits.

3. A generic solenoid driver circuit board for use in connection with a plurality of solenoid driver circuits, comprising:
   a plurality of binary driver circuit locations, including electrical runs connecting binary driver component sites in a manner that permits selected binary driver electrical components to function as a binary driver circuit when appropriately installed in the binary driver component sites;
   a plurality of proportional driver circuit locations, including electrical runs connecting proportional driver component sites in a manner that permits selected proportional driver electrical components to function as a proportional driver circuit when appropriately installed in the proportional driver component sites;
   a memory device;
   a decoder device, electrically connected to said plurality of proportional driver circuit locations;
   a latch device;
   a plurality of first microprocessor controlled switches, each of said first microprocessor controlled switches being electrically connected to one of said plurality of binary driver circuit locations and to one of said plurality of proportional driver circuit locations;
   a plurality of second microprocessor controlled switches, each of said second microprocessor controlled switches being electrically connected to said latch and to one of said plurality of binary driver circuit locations;
   a microprocessor electrically connected to said memory device, said decoder, said latch, said plurality of first and second microprocessor controlled switches and said plurality of proportional driver circuit locations;
   wherein at least one of said plurality of binary driver circuit locations is electrically connected to a solenoid; and
   wherein electrical components are inserted in at least one of said plurality of binary driver circuity locations.

* * * * *